(12) United States Patent
Mahabadi et al.

(10) Patent No.: US 12,336,883 B2
(45) Date of Patent: Jun. 24, 2025

(54) PROTECTIVE SHIELD FOR DENTAL IMPLANT

(71) Applicant: SMART DENTAL CARE INC., Oshawa (CA)

(72) Inventors: Meysam Mahabadi, Oshawa (CA); Fariborz Vafaee, Oshawa (CA); Hamed Bonakdar, Oshawa (CA); Seyed Ahmad Moghadasi, Oshawa (CA)

( * ) Notice: Subject to any disclaimer, the term of this patent is extended or adjusted under 35 U.S.C. 154(b) by 353 days.

(21) Appl. No.: 17/859,095

(22) Filed: Jul. 7, 2022

(65) Prior Publication Data

US 2024/0008961 A1 Jan. 11, 2024

(51) Int. Cl.
*A61C 8/00* (2006.01)

(52) U.S. Cl.
CPC ................... *A61C 8/0089* (2013.01)

(58) Field of Classification Search
CPC ............ A61C 9/0033; A61C 5/82; A61C 5/80
See application file for complete search history.

(56) References Cited

U.S. PATENT DOCUMENTS

| 3,151,393 | A | * | 10/1964 | Holmes | A61C 9/0033 |
| | | | | | 433/218 |
| 3,541,689 | A | * | 11/1970 | Snead | A61C 9/0033 |
| | | | | | 433/141 |
| 2013/0101964 | A1 | * | 4/2013 | Fudim | A61C 8/006 |
| | | | | | 433/214 |
| 2017/0020635 | A1 | * | 1/2017 | Svoboda | A61C 8/006 |
| 2019/0000591 | A1 | * | 1/2019 | Rau | A61C 8/008 |
| 2020/0188074 | A1 | * | 6/2020 | Ryuma | A61C 5/82 |

FOREIGN PATENT DOCUMENTS

| KR | 20200016124 A | * | 2/2020 | | A61C 7/0077 |
| WO | WO-2019021337 A1 | * | 1/2019 | | A61C 13/225 |

* cited by examiner

*Primary Examiner* — Heidi M Eide
(74) *Attorney, Agent, or Firm* — Nasser Ashgriz; UIPatent Inc.

(57) ABSTRACT

A protective shield and a method to protect the peri-implant tissue from excess cement in a cement-retained implant are disclosed. The protective shield comprises a lingual wing, a buccal wing and a funnel-shaped protrusion to be seated and extended circumferentially around the abutment or a fixture in tissue-level implants to seal between the abutment or the fixture in tissue-level implants and the shield. The protective shield has a shearing line with inverted ledges and V-shaped notches on the mesial and distal end that create a tearing line to tear and remove the protective shield and thereby the excess cement. The protective shield is designed and made of flexible material, in various sizes by 3D scanning and printing technology.

4 Claims, 9 Drawing Sheets

PROTECTIVE SHIELD FOR DENTAL IMPLANT

FIELD OF THE INVENTION

The present invention relates in general to the dentistry industry and in specific to a protective shield for preventing peri-implant diseases in implant patients.

BACKGROUND OF THE INVENTION

Cement-retained dental implant treatment has been successful and favourable over screw-retained treatment to restore lost teeth due to an associated number of advantages. These include easier control of occlusion, higher esthetic results, good passive fitness, fewer complex manufacturing procedures, lower costs, and similarity to conventional methods of restoration in natural teeth. Nonetheless, cement-retained implants carry a problem of leaving excess cement on the implant or in the surrounding soft tissues, which has been associated with pen-implant disease and consequent implant failures. "Peri-implant disease" is disease that affects the tissues associated with an oral implant and/or abutment. Bacteria grow in the soft tissue (mucositis) or progress to the supporting bone and induce its destruction (peri-implantitis).

This problem has caused clinicians to choose screw-retained restorations, despite their deficiencies, such as lower esthetic results and reduced effective occlusal surface. The problem has been proven in several studies. A study involved 20 females and 19 males, ranging in age from 41 to 78 years, who used 34 of 42 test implants (80.95%) and no control implants (0%). Of the 33 test implants available for evaluation at the 1-month interval, the clinical and endoscopic signs of peri-implant disease had resolved in 25 implants. The study concluded that excess dental cement was associated with signs of pen-implant disease in the majority (81%) of the cases. Clinical and endoscopic signs of pen-implant disease were absent in 74% of the test implants after the removal of excess cement. All types of excess cement observed were associated with peri-implant disease. The peri-implant disease was not cement-specific—all types of cement can cause the disease.

There are some unspecific methods trying to avoid excess cement during implant prosthesis cementation such as using a rubber dam or replica technique however these methods do not specifically address this problem and their efficacy is controversial."Gcuff" has been designed for multiple purposes such as impression making and temporary gingival shaping made from a rigid material and not 3d designed with cad cam devices which is specific for each implant prosthesis.

The present invention provides a novel method and system to overcome the commonly occurring problem encountered during the cementation of dental implant prosthesis, namely excess cement residue on the implant-mucosal surface.

SUMMARY OF THE INVENTION

The present invention is a device and method to protect the peri-implant tissue from excess cement in a cement-retained implant. The present invention is a 3d meticulously designed protective shield that prevents the penetration of excess cement to peri-implant soft tissues, and it can be used with every implant system based on their specific 3d geometry. In addition, it can be customized and can be used in mass production as an adjunctive part with different implant systems. The solution involves the use of 3D printing technology which simulates and fabricates models precisely using a wide variety of materials, ranging from low flexible to highly flexible materials.

The protective shield's solution creates a layer that prevents the penetration of excess cement to peri-implant soft tissues. The simple, affordable, and efficient technique will assist clinicians in combating the issue. The protective shield's application will involve manufacturing a custom flexible and thin protective shield, by a 3d printer, upon scanning the abutment and its surrounding tissues and can be made specifically for different implant systems with mass production with any flexible material with data gathered from 3d specific designs with technology to reduce the costs.

The protective shield has a lingual wing facing toward the tongue and a buccal wing both having a curvature slightly upward on the distal ends and inverted ledges on the proximal ends. The shield further has a funnel-shaped circular opening in the center that extends downwardly to receive the abutment and has inverted ledges around the funnel which extend circumferentially around the implant.

The lingual wing and the buccal wing create a shearing part in connection to each other so that the shearing part in the funnel and shearing parts on the wings create a tearing line to guarantee the tearing and removing the excess cement according to the aspects of the present invention. In addition, the shearing part on the wings has V-shaped notches to facilitate the removal of the shield by tearing that from those areas. In addition, projections are designed to guarantee the removal of any remained cement.

The protective shield is easily placed on the abutment from the apical side to fit this component intimately. The position of the shield is at least 0.5 mm above the switched platform and 0.5 mm below the margin of the abutment, by considering the oral-facial direction of the shield. Once all these are completed, the abutment will be placed into the patient's mouth and tightened on the corresponding implant. At this point, everything is ready for implementing the cementation procedure.

After the cementation procedure is completed, any excess cement is pushed out and any entrapment is prevented as a result of the seal between the abutment and the shield. When the cementation procedure is complete, the shield is pulled out from the oral and facial sides, using a hemostat pliers to be torn from the V-shaped notches. It is worth mentioning that the projections on the weak areas of the shield help in removing any remaining excess cement from the area.

The protective shield has applications for both bone-level implants and tissue-level implants. The main feature involves a funnel-shaped barrier that is connected to the flat part and made with resilient 3d printed materials to seal the area. however, the protective shield will significantly benefit bone-level implants, due to the subgingival nature of bone-level implants.

Therefore, it is an object of the present invention to provide a system and method to prevent dental implant failure due to residual excess cement and save money and time for dental implant companies, dentists and patients.

It is another object of the present invention to wave the need for cast and abutment itself, as all procedures can be performed on digital data and sent via email by a dentist or a dental technician.

It is another object of the present invention to provide the capability to mass-produce prefabricated protective shields for different available brands of implants.

It is another object of the present invention to provide dental professionals with an improved prognosis of their patients, for more profitable practices.

it is another object of the present invention that is based on 3d scans and has some special features, and it can be made with a resilient material, so the results are more accurate than other methods and techniques.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF PREFERRED EMBODIMENTS

Figure 1:
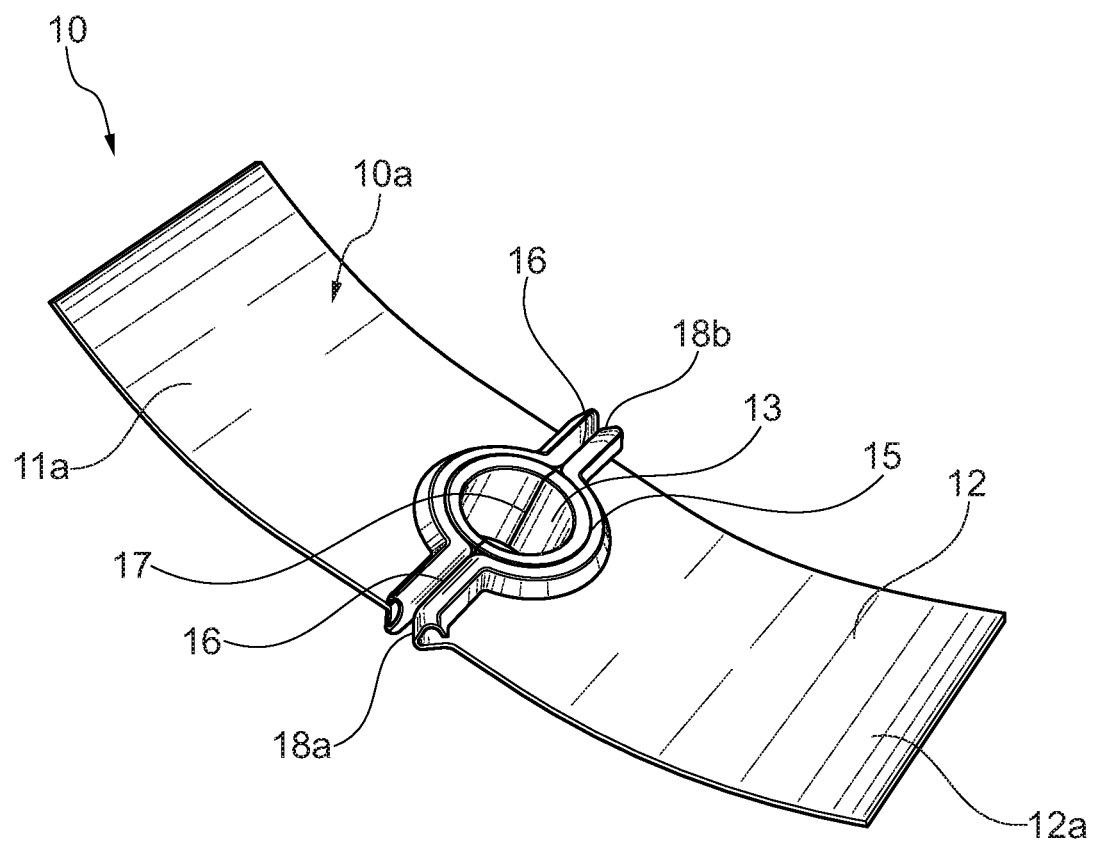
FIG. 1 shows a perspective top view of the bone-level protective shield of the present invention.
Figure 2:
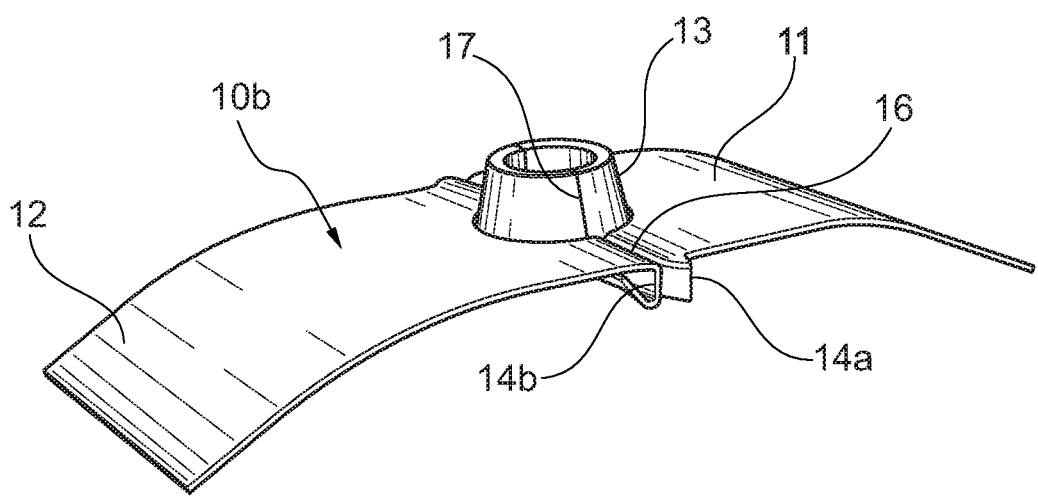
FIG. 2 shows a perspective bottom view of the bone-level protective shield of the present invention.

A protective shield to protect the peri-implant tissue from excess cement in cement-retained implants is disclosed. The protective shield has applications for both bone-level implants and tissue-level implants, however, it will significantly benefit bone-level implants, due to the subgingival nature of bone-level implants.

According to FIGS. 1 to 7, a bone level protective shield 10 is illustrated according to the present invention. The protective shield 10 comprises a lingual wing 11 facing toward the tongue and a buccal wing 12 facing toward the cheek. The lingual wing 11 and the buccal wing 12 are placed on an abutment adjacent to each other building a wing shearing line 16. The protective shield has an upper side 10a and a lower side. 10b and the wings are curveted slightly upwards on their distal ends 11a and 12a.

The wings 11 and 12 have a funnel-shaped protrusion 13 on the central lower side 10b so that when placed on the abutment 20 adjacent to each other create a funnel shape opening to be seated and extended circumferentially around the abutment 20. The funnel shaped protrusion 13 further has a funnel shearing line 17 so that the wing shearing line 16 and funnel shearing line 17 are placed adjacent and build a tearing line.

The wing shearing line 16 has inverted ledges 14a, 14b around the wing and V-shaped notches on the mesial and distal ends 18a, 18b. The inverted ledges of the wing shearing line and the funnel shearing line and the V-shaped notches on the mesial and distal end and the funnel shape protrusion create a tearing line to tear and remove the excess cement according to the present invention. The shield is designed so that the areas ended with V-shaped notches are reduced in thickness (weak areas) to facilitate the removal of the shield by tearing that from those areas. In addition to that, projections are designed above the weak areas to guarantee the removal of any remained cement.

According to FIG. 1 again the funnel-shaped part 13 has an inverted ledge 15 around the funnel that extends circumferentially around the implant to remove excess cement and make it safe to remove without any residue after dental implant prosthesis cementation procedure.

Figure 3:
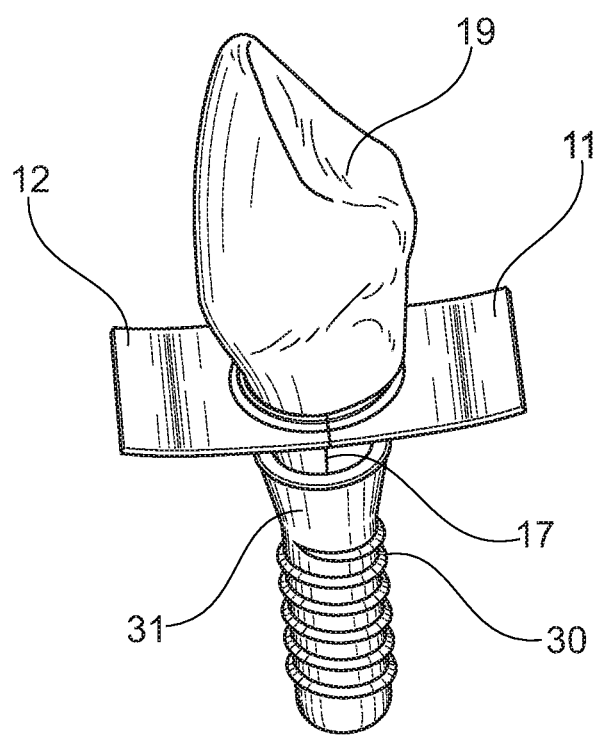
FIG. 3 shows a perspective assembled view of the bone-level protective shield of the present invention.
Figure 4:
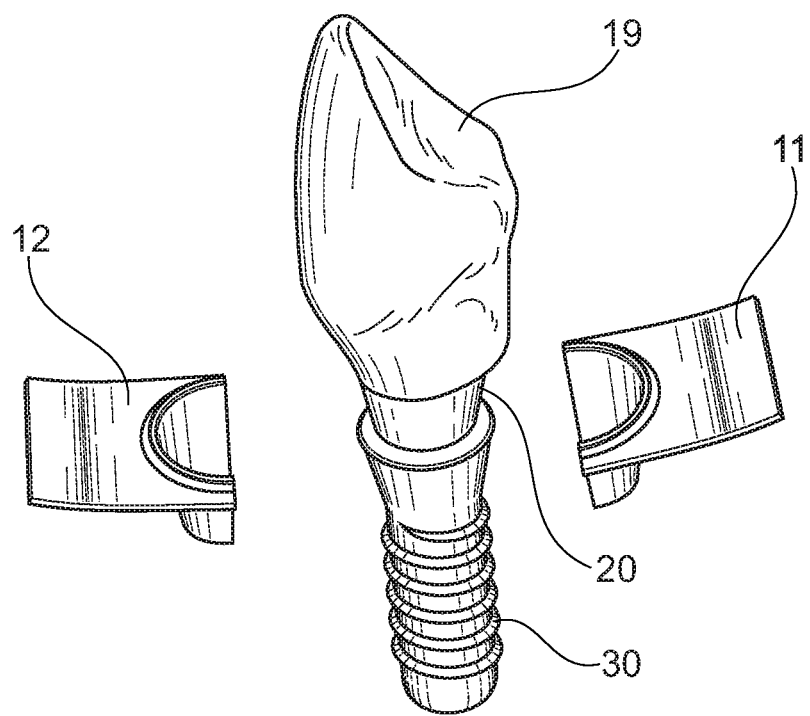
FIG. 4 shows a perspective exploded view of the bone-level protective shield of the present invention.
Figure 5:
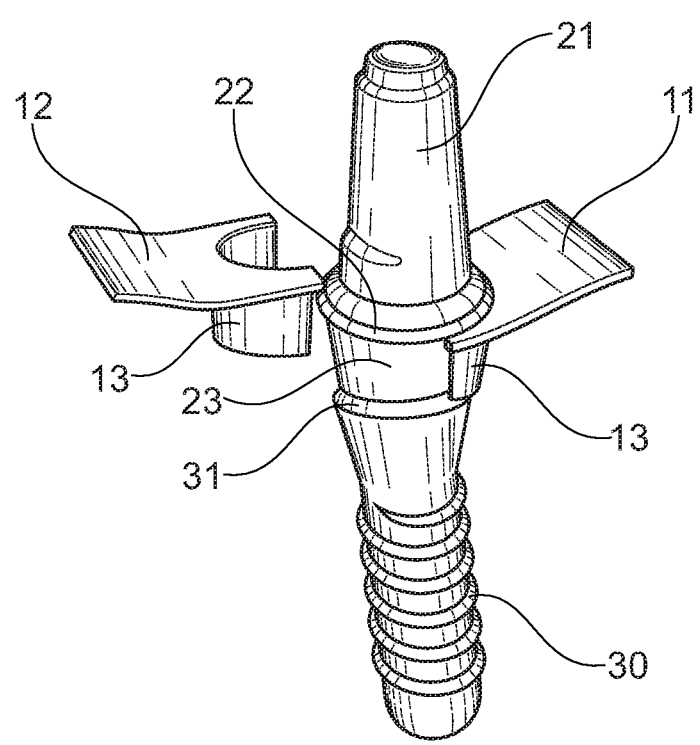
FIG. 5 shows a perspective view of the bone-level protective shield of the present invention and placement on the abutment.
Figure 6:
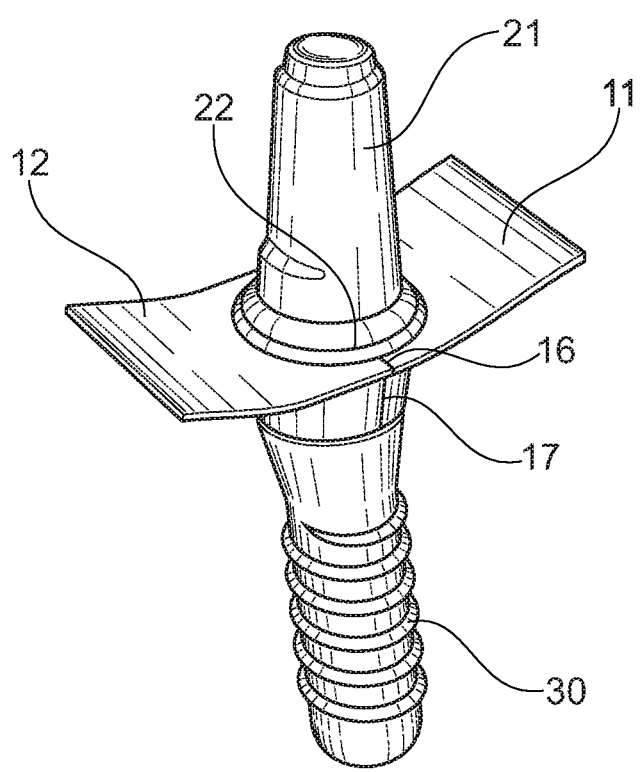
FIG. 6 shows a perspective view of the protective shield of the present invention and the bone level abutment.
Figure 7:
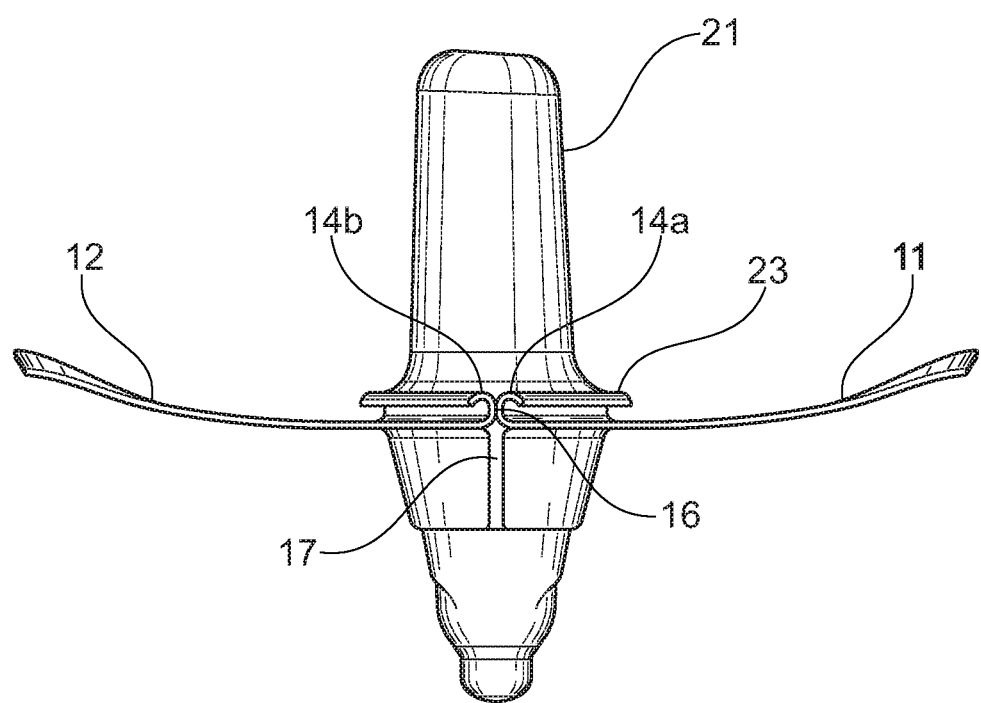
FIG. 7 shows a side view of the protective shield of the present invention and the bone level abutment.

FIGS. 3 to 7 show the clinical step which involves placement of the protective shield 10. The shield 10 is easily placed on abutment 20 from the apical side. The placement of the shield 10 is easy and fast due to the funnel shape of the bone-level abutments. The bone-level abutments have a crown margin 22 with an inverted ledge around the abutment margin 23. The position of the shield 10 must be at least 0.5 mm below the abutment crown margin 22 so that the funnel part 13 of the protective shield encompasses the abutment cuff 23, and 0.5 mm above the switched platform 31 of the abutment, and by considering the oral-facial direction of the shield. Once shield 10 is placed on the abutment 20, the abutment will be placed into the patient's mouth and tightened on the corresponding implant 30. At this point, everything is ready for implementing the cementation procedure. FIG. 3 shows the cement-retained crown 19.

An amount of cement is provided to fix the restoration to an implant abutment. Usually, in the cementation procedure, the clinicians place in excess of 20 times more cement into the crown than is required. This overload of cement means that 95% is extruded out at the restorative margin, which is frequently found below the gum, making cement removal virtually impossible and causing diseases. The present invention helps the clinician to remove the excess cement and guarantees the removal of any remained cement.

Implants have a coronal or gingival end with a threaded bore extending upwardly. The coronal end extends downwardly along a cylindrical body to a distal end and connects to the abutment. The upper part of abutment 21 has a cylindrical configuration and extends to a bottom part that abuts against the coronal end of implant 30. Abutments 20 may be provided with an engaging feature that engages with the implant 30. The abutment has a crown margin 22 that includes a shoulder at the top portion. A corresponding ledge is formed along the exterior surface adjacent shoulder. The cuff 23 tapers outwardly and upwardly away from the coronal end of the implant and forms a frusto-conical shape. This tapering continues to a ledge and then transitions to taper inwardly at the upper portion of the cuff. A shoulder is located along the inner surface. This shoulder fits with the mating ledge on the exterior of the core. The protective shield is designed to fit tight around the abutment crown margin 22 and seal between abutment 20 and shield 10.

When the cementation procedure is complete, the shield 10 is pulled out from the oral and facial sides, using a hemostat pliers to be torn from the V-shaped notches 18a, 18b. It is worth mentioning that the projections on the weak areas of the shield-wing shearing parts 16 and funnel shearing parts 17 help in removing any remaining excess cement from the area. The protective shield 10 is made of flexible material and in various sizes that help the easy removal of the shield.

Tissue-level implants require the margin of the restoration to be placed on the margin of the implant, which is often at the level of the soft tissue. As a result, it is less likely for tissue-level implants to have problems with excess cement. However, if required, the specification of the implant can be used to design the apical portion of the protective shield, since the location of the margin is not altered. For it to be easily placed, the shield should be manufactured from more resilient material to allow for insertion from the top of the implant fixture. The height of the apical part should not exceed 1 mm. It is apparent that producing prefabricated shields for tissue-level implants is easier than the bone-level types.

Figure 8:
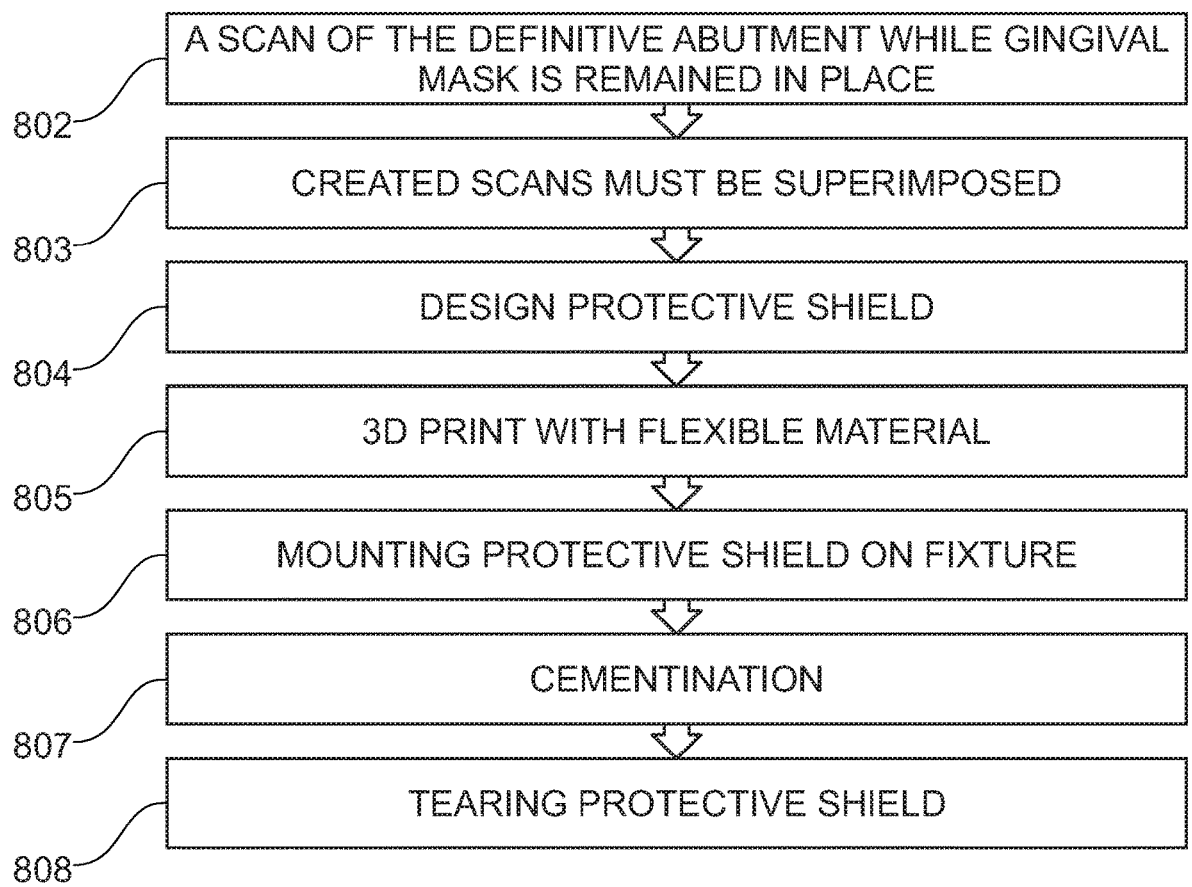
FIG. 8 shows a diagram of the method of prevention of the penetration of excess cement to peri-implant soft tissues for bone-level implants by the bone-level protective shield of the present invention.

According to FIG. 8 the following steps will be undertaken for bone level implants 800. In step 801 a scan of the definitive abutment is created. This scan is performed on the definitive cast while the gingival mask is removed. In step 802 another scan of the definitive abutment is created while the gingival mask is in place on the definitive cast. In step 803 the two created scans are superimposed on each other. In step 804 the lingual and buccal wings of the protective shield are designed from the resulting 3D scans. Then, the other part of the shield which is covering the supragingival part of the peripheral soft tissue should now be designed to create the funnel-shaped part of the protective shield. The amount of coverage in the facial and oral sides of the implant should be designed to surpass the outline of the crown by 3 millimetres. Additionally, the shield should be designed not to interfere with the seating of the restoration. Thus, a thickness of 0.5 mm is advised for this purpose.

In step 805 the designed protective shield is fabricated from a flexible material using a 3D printer. The weak areas (reduced thickness) ended to V-shaped notches are designed on the mesial and distal parts of the shield to facilitate removal of the shield by tearing that from those areas. In addition to that, projections are designed above the weak areas to guarantee the removal of any remained cement. When the digital workflow is adopted, the above-mentioned scanning procedures have often been performed previously, so that the net invested time for creating the shield would be minimal. Having all the data from previously performed scans, the remaining procedures to design the shield would be limited to merely determining the periphery of the shield and the place of the weak area and related notches.

In step 806 which is the clinical step involves placement of the protective shield. It is easily placed on the abutment from the apical side to fit the shield intimately. The placement of the shield is easy and fast due to the funnel shape of the bone-level abutments. The position of the shield must be in accordance with the above specifications—being at least 0.5 mm above the switched platform and 0.5 mm below the margin of the abutment, and by considering the oral-facial direction of the shield. Once all these are completed, the abutment will be placed into the patient's mouth and tightened on the corresponding implant.

At this point, in step 807, everything is ready for implementing the cementation procedure. Any excess cement is pushed out and any entrapment is prevented as a result of the seal between the abutment and the shield. When the cementation procedure is complete, in final step 808, the shield is pulled out from the oral and facial sides, using hemostat pliers to be torn from the V-shaped notches. It is worth mentioning that the projections on the weak areas of the shield help in removing any remaining excess cement from the area.

Figure 9:
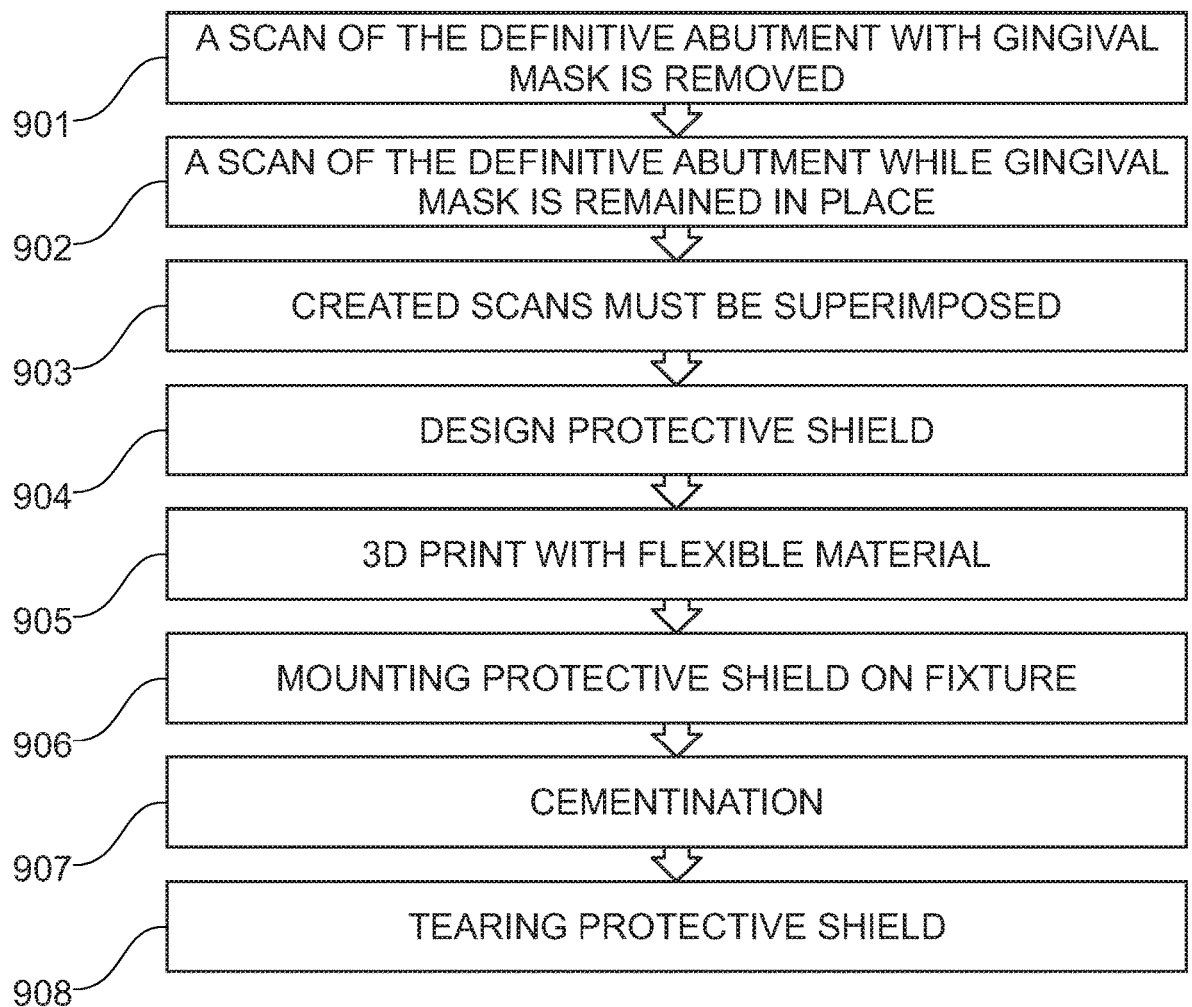
FIG. 9 shows a diagram of the method of prevention of the penetration of excess cement to peri-implant soft tissues for tissue-level implants by the tissue-level protective shield of the present invention.

FIG. 9 shows the same procedure for tissue-level Implants. Tissue-level implants require the margin of the restoration to be placed on the margin of the implant, which is often at the level of the soft tissue. As a result, it is less likely for tissue-level implants to have problems with excess cement. However, if required, the specification of the implant can be used to design the apical portion of the protective shield, since the location of the margin is not altered. For it to be easily placed, the shield should be manufactured from more resilient material to allow for insertion from the top of the fixture. The height of the apical part should not exceed 1 mm. It is apparent that producing prefabricated shields for tissue-level implants is easier than the bone-level types.

The following steps will be undertaken for tissue-level implants 900. In step 901 a scan of the definitive abutment must be taken. This scan must be performed on the definitive cast while the gingival mask is removed. In step 902 another scan of the definitive abutment must be created while the gingival mask is in place on the definitive cast.

In step 903 the two created scans must be superimposed on each other. The protective shield is designed from the resulting 3d scans. This shield should be designed to cover 1 millimetre below the fixture margin since it should be placed from above so it should be flexible enough to allow a complete seat from above. This modelling can be quickly rendered, having the characteristics of each commercially available fixture. This guides the excess cement out of the critical transgingival portion of the implant.

In step 904 the other part of the shield which is covering the supragingival part of the peripheral soft tissue should now be designed to create a funnel-shaped protective shield, extended circumferentially around the implant. The amount of coverage in the facial and oral sides of the implant should be designed to surpass the outline of the crown by 7 millimetres. Additionally, the shield should be designed not to interfere with the seating of the restoration. Thus, a thickness of 0.5 to 1 mm is advised for this purpose.

Shearing areas (reduced thickness) ended with V-shaped shearing notches designed on the mesial and distal parts of the shield to facilitate removal of the shield by tearing that from those areas. In addition to that, inverted ledges are designed above the shearing areas to guarantee the removal of any remained cement.

In step 905 the designed protective shield is fabricated from a flexible material using a 3d printer. When the digital workflow is adopted, the above-mentioned scanning procedures have often been performed previously, so that the net invested time for creating the shield would be minimal. Having all the data from previously performed scans, the remaining procedures to design the shield would be limited to merely determining the periphery of the shield and the place of the weak area and related notch.

This clinical step 906 involves the placement of a protective shield. It is easily placed on the abutment from the coronal (top) side to fit this component intimately and it should snap on the fixture collar to place just 0.5 mm below the margin. The placement of the shield is easy and fast due to the flexibility of the protective shield.

At this point, in step 907 everything is ready for the cementation procedure. Any excess cement is pushed out and any entrapment is prevented because of the seal between the fixture and the shield. When the cementation procedure is complete, in step 908 the shield is pulled out from the oral and facial sides, using hemostat pliers while the patient firmly bites on the cotton roll to be torn from the V-shaped notches. It is worth mentioning that the inverted ledges on the shield's weak areas help remove any remaining excess cement from the area.

For mass production, 3d data gathered can be used from previous scans for each specific implant system and can be used to make multiple instances of protective shields in different sizes. The shields can be customized for each abutment as a kit.

The foregoing is considered illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

With respect to the above description, it is to be realized that the optimum relationships for the parts of the invention regarding size, shape, form, materials, function and manner of operation, assembly and use are deemed readily apparent and obvious to those skilled in the art, and all equivalent relationships to those illustrated in the drawings and described in the specification are intended to be encompassed by the present invention.

What is claimed is:

1. A protective shield to protect a peri-implant tissue from excess cement in cement-retained implants, the protective shield comprising:

a lingual wing and a buccal wing, wherein when placed in the mouth, the lingual wing is configured to face toward an oral part of a mouth and the buccal wing is configured to face toward a facial part of the mouth;

the lingual wing and the buccal wing each have a distal end, a proximal end, an upper side and a lower side;

wherein said lingual wing and the buccal wing are curved upwards on their distal ends;

the lingual wing has a first protrusion on the lower side and a first inverted ledge on the upper side of its proximal end and the buccal wing has a second protrusion on the lower side and a second inverted ledge on the upper side of its proximal end, wherein the first protrusion and the second protrusion form a funnel shape protrusion to be seated and extended circumferentially around the abutment, the lingual wing and the buccal wing forming a single integral piece configured to be separated apart from one another along a wing shearing line and a funnel shearing line, whereby the protective shield seals the abutment before a cementation procedure and the first and second inverted ledges can be grabbed and pulled by a plier to remove the protective shield.

2. The protective shield of claim 1, wherein the proximal ends of the lingual and buccal wings each have a notch forming a V-shaped notch on a mesial and a distal end configured to provide an easy access to remove the lingual and buccal wings.

3. The protective shield of claim 1, wherein the protective shield is made of flexible material.

4. The protective shield of claim 1, wherein the thickness of the shield is 0.5 to 1 mm to prevent interference with the placement on the abutment.

* * * * *